United States Patent
Missoni et al.

(10) Patent No.: US 11,152,314 B2
(45) Date of Patent: Oct. 19, 2021

(54) INTEGRATED CIRCUIT WITH SUPPLY CIRCUIT COMPRISING FIELD-EFFECT TRANSISTORS

(71) Applicant: Infineon Technologies AG, Neubiberg (DE)

(72) Inventors: Albert Missoni, Graz (AT); Stefan Schneider, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/804,700

(22) Filed: Feb. 28, 2020

(65) Prior Publication Data

US 2020/0279817 A1  Sep. 3, 2020

(30) Foreign Application Priority Data

Mar. 1, 2019 (DE) .......................... 102019105249.1

(51) Int. Cl.
*H01L 23/00* (2006.01)

(52) U.S. Cl.
CPC .................................. *H01L 23/576* (2013.01)

(58) Field of Classification Search
CPC ...................................................... H01L 23/576
USPC ......................................................... 257/369
See application file for complete search history.

(56) References Cited

U.S. PATENT DOCUMENTS

| | | | | |
|---|---|---|---|---|
| 2003/0128201 A1* | 7/2003 | Ishizuka | ............... | G09G 3/3233 345/212 |
| 2013/0100559 A1* | 4/2013 | Kuenemund | .... | H03K 19/17768 361/42 |
| 2013/0200371 A1* | 8/2013 | Marinet | ............. | H01L 29/7322 257/48 |

FOREIGN PATENT DOCUMENTS

| | | | |
|---|---|---|---|
| DE | 102006000936 A1 | | 7/2007 |
| DE | 102011018450 A1 | | 10/2012 |
| DE | 102014102623 A1 | | 8/2015 |
| DE | 102014107455 A1 | * | 12/2015 ........... H01L 23/576 |

OTHER PUBLICATIONS

German Patent Office, Office Action issued for DE 102019105249. 1, 6 pgs., dated Nov. 8, 2019.

* cited by examiner

*Primary Examiner* — Ajay Arora
(74) *Attorney, Agent, or Firm* — Schiff Hardin LLP

(57) ABSTRACT

An integrated circuit having a plurality of field-effect transistors, wherein at least a proportion of the field-effect transistors implement a plurality of logic cells, a substrate, a well which is arranged in the substrate, and a supply circuit which is designed to connect the well to a supply potential, wherein the supply circuit is constituted by one or more field-effect transistors of the plurality of field-effect transistors.

20 Claims, 8 Drawing Sheets

INTEGRATED CIRCUIT WITH SUPPLY CIRCUIT COMPRISING FIELD-EFFECT TRANSISTORS

TECHNICAL FIELD

The exemplary embodiments relate to integrated circuits in general.

BACKGROUND

Chips with integrated circuits (ICs), which are employed for security-critical applications, for example on chipcards or in security controllers, are typically protected against attacks. Radiation attacks, e.g. laser attacks or ionizing radiation attacks, which are intended to cause a functional impairment of a component, constitute one such type of attack. Options for the detection of such fault attacks on digital circuits are desirable.

SUMMARY

According to one exemplary embodiment, an integrated circuit is provided, having a plurality of field-effect transistors, wherein at least a proportion of the field-effect transistors implement a plurality of logic cells, a substrate, a well which is arranged in the substrate, and a supply circuit which is designed to connect the well to a supply potential, wherein the supply circuit is constituted by one or more field-effect transistors of the plurality of field-effect transistors.

BRIEF DESCRIPTION OF THE FIGURES

The figures do not reproduce actual dimensional proportions, but are intended to illustrate the principles of the various exemplary embodiments. Various exemplary embodiments are described hereinafter, with reference to the following figures.

DETAILED DESCRIPTION

The following detailed description relates to the attached figures, which show details and exemplary embodiments. These exemplary embodiments are described to a level of detail which will permit the execution of the invention by a person skilled in the art. Other forms of embodiment are also possible, and the exemplary embodiments can be modified in their structural, logical and electrical aspects, without deviating from the object of the invention. The various exemplary embodiments are not necessarily mutually exclusive, but various forms of embodiment can be mutually combined, thereby constituting new forms of embodiment. In the context of this description, the terms "bonded", "connected" and "coupled" are employed to describe both a direct and an indirect bond, a direct or indirect connection, and a direct or indirect coupling.

Figure 1:
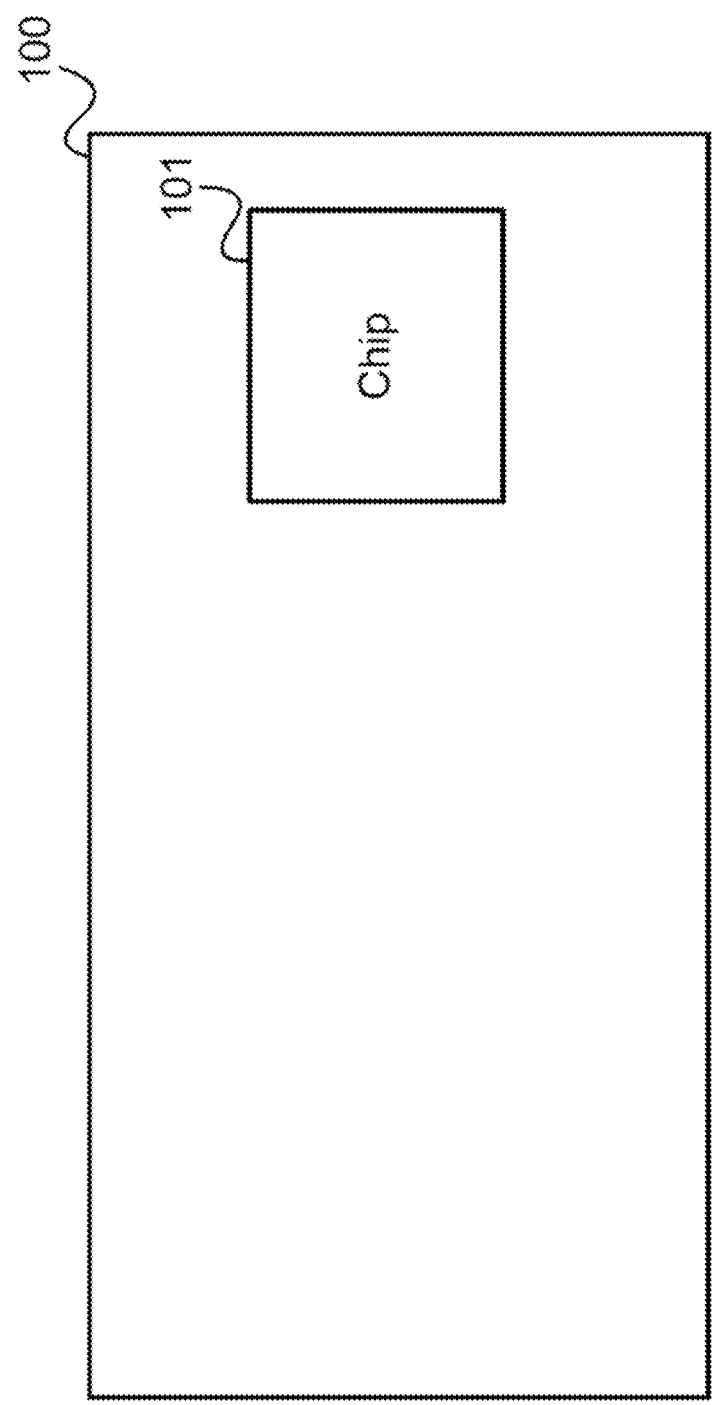
FIG. 1 shows an example of a data processing device, which is to be protected against radiation attacks.

FIG. 1 shows an example of a data processing device 100, which is to be protected against radiation attacks.

The data processing device 100 can be a control device or a microcontroller in a motor vehicle, e.g. an ECU (electronic control unit) in a car. It can also be a chipcard IC (integrated circuit) of a chipcard, such as a smartcard, with any desired form factor, e.g. for a pass or a SIM (subscriber identity module).

The data processing device 100 comprises an integrated circuit, e.g. a chip 101, which is to be protected against radiation attacks. The chip can be a control chip, and can implement, for example, a processor, a coprocessor (e.g. a crypto-processor) and/or a memory. The chip can also be, for example, a RFID (radio-frequency identification) chip, or can implement a SIM (subscriber identity module) for a mobile telephone. The chip can be provided for a security application, and can be designed e.g. for the storage or processing of confidential data and/or for the authentication of a user.

On an integrated circuit (IC) 101 for a security application, for example, detectors can be integrated, which are designed to protect the IC against light energy attacks (or radiation attacks in general). Options for this purpose include, for example:

A) A "large" well detector, which monitors, for example, the potential of a large n-well and of a plurality of connected n-wells by means of a comparator B) A small number of dedicated light sensor cells in the logic region (which are arranged in accordance with security requirements)

C) A systematic and regular light sensor cell matrix.

Figure 2:
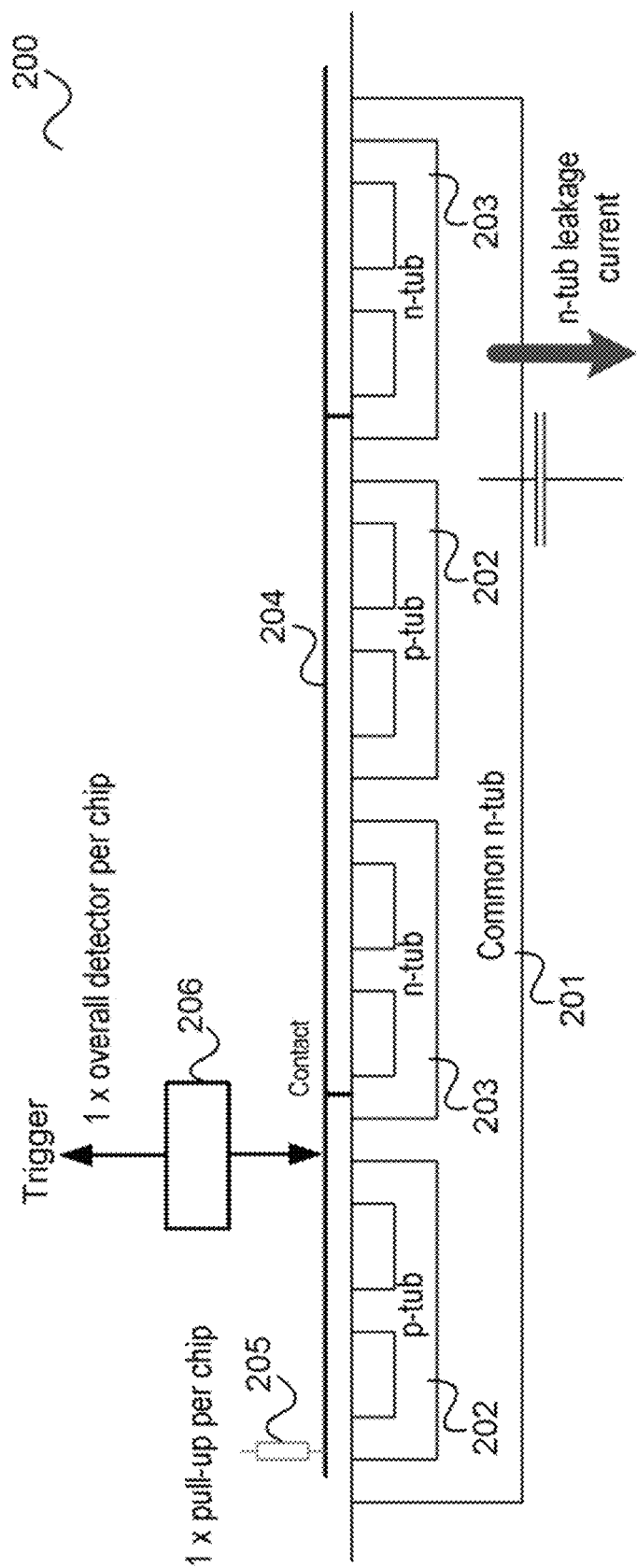
FIG. 2 shows an example of a well detector.

FIG. 2 shows an example of a well detector (in accordance with the above-mentioned option A).

FIG. 2 shows a cross-section of a chip 200, which comprises a common n-well 201, and p-wells 202 and n-wells 203 arranged therein. The n-wells 203 are interconnected by means of a connection line 204. The connection line is connected via an overall pull-up circuit 205 to the high supply potential (VDD), and an overall detection circuit 206, e.g. a voltage sensor, which is connected to the connection line 204, monitors the potential of the n-wells 203.

However, an overall detector, of the type provided, for example, in FIG. 2 is typically not appropriate for the protection of smaller individual circuit blocks against local attacks (over surface areas ranging from one to a few hundred standard gate array surfaces). This is due to the fact that, in the event of a local attack, although the potential is subject to local variation, the connection of the n-wells 203 is such that this overall effect is diluted to the extent that it cannot be detected by the overall detection circuit 206.

Consequently, in place of an overall pull-up circuit and an overall detection circuit, one alternative is the provision of a plurality of local pull-up circuits and a plurality of local detection circuits. An example of this is represented in FIGS. 3 and 4.

Figure 3:
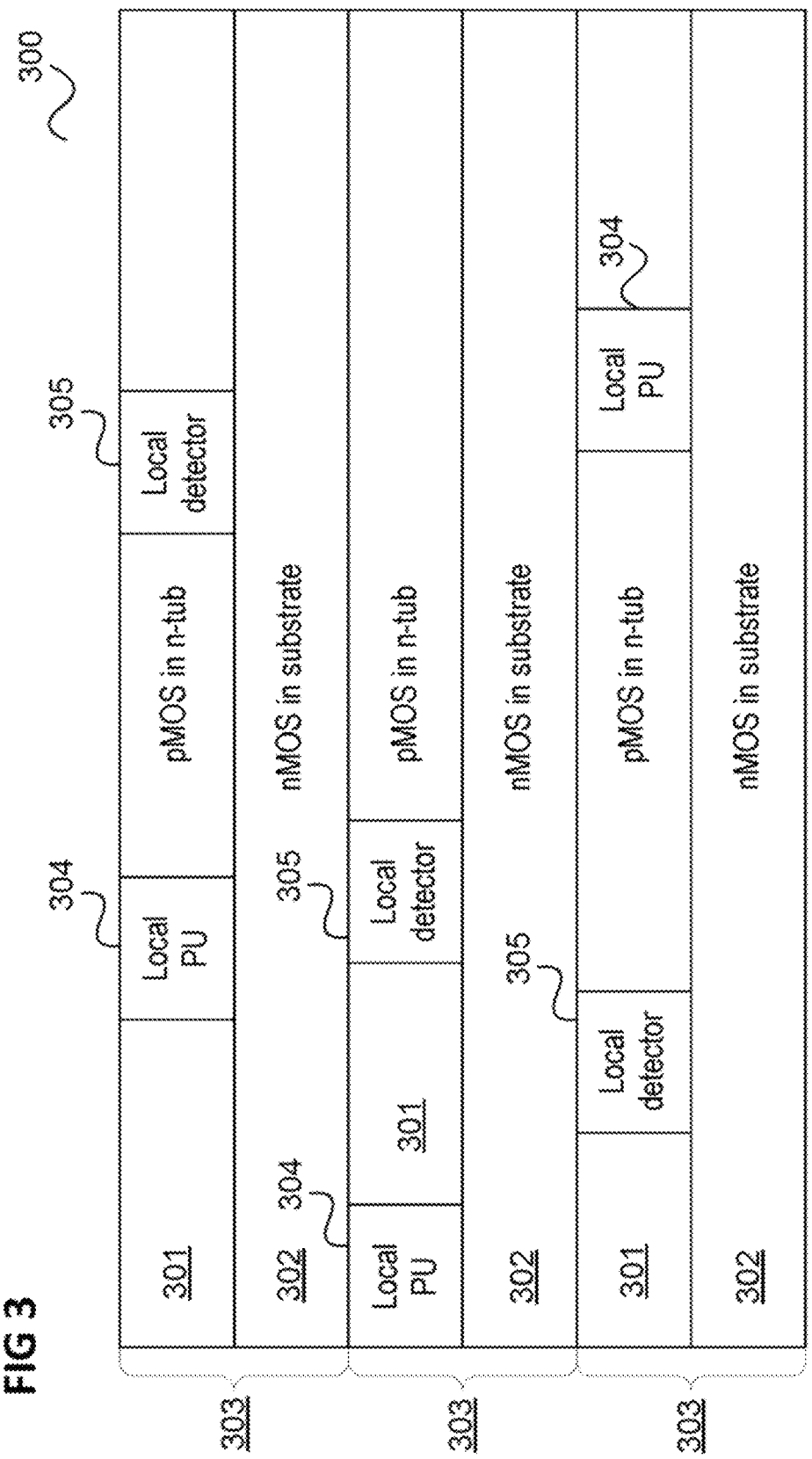
FIG. 3 shows an overhead view of a chip.
Figure 4:
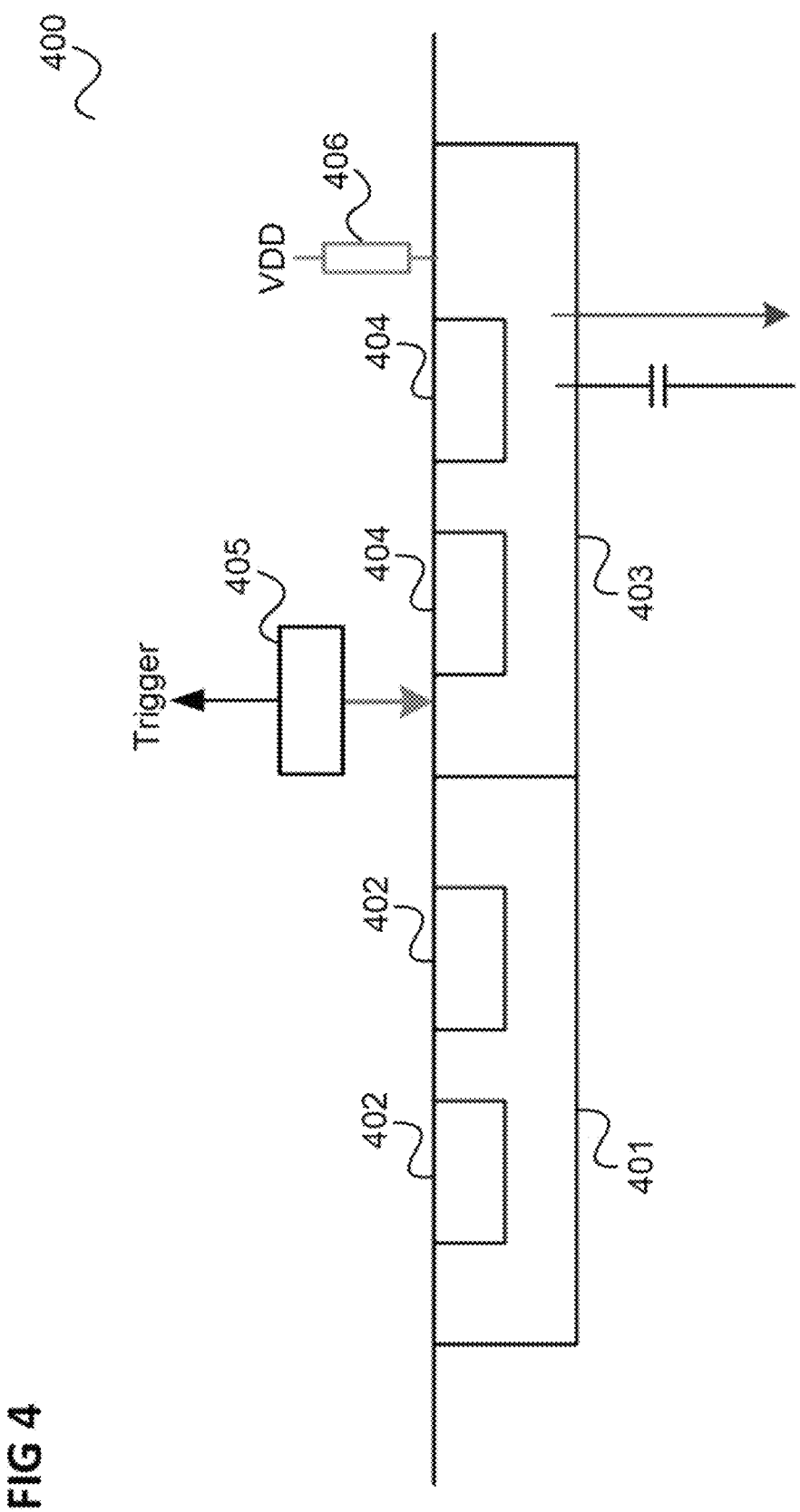
FIG. 4 shows a cross-section of a logic track of the chip.

FIG. 3 shows an overhead view of a chip 300.

The chip 300 is produced using CMOS (complementary metal oxide semiconductor) technology.

In the chip 300, n-wells 301 are arranged in a p-substrate such that, in an overhead view, n-well strips 301 are formed, which alternate with p-substrate strips 302.

The logic, i.e. the components which deliver the logic functionalities of the chip 300, such as pMOS (metal oxide semiconductor) transistors and n-MOS transistors, and the logic cells which are constituted therefrom, are embedded in the n-wells 301 and the p-substrate 302.

Specifically, pMOS transistors are arranged in the n-wells 301, and nMOS transistors are arranged in the p-substrate 302. It should be observed that, although p-wells can also be provided, it is assumed in the present example, in the interests of simplicity, that the nMOS transistors are arranged in the p-substrate 302.

In each case, an n-well strip 301 and an adjoining p-well strip 302 can constitute a logic track 303, which implements numerous different logic cells by means of the MOS transistors arranged therein.

In each logic track 303, for the respective n-well 301, a local pull-up circuit 304 is provided. Moreover, for each logic track 303, a detector circuit (or detection circuit) 305, e.g. a digital light detector circuit, is provided. The detector circuit 305 monitors the associated ("local") n-well 301.

FIG. 4 shows a cross-section of a logic track 400 of the chip 300.

The logic track 400 comprises a p-substrate strip 401 with nMOS transistors 402, and an n-well strip 403 with pMOS transistors 404. The n-well strip 403 is connected to a detection circuit 405 (which comprises, for example, a latch) and a pull-up circuit 406.

The chip 300 is thus clearly protected against an attack, for example in the form of a laser attack, in that the regularly arranged logic n-wells 301, 403 (of which hundreds may be present on the chip 300) are employed as photon collectors.

As each n-well 301, 403 has a dedicated pull-up circuit 304, 405, it is not necessary for the n-wells 301, 403 to be interconnected, as in the case of the n-wells 203 in the example according to FIG. 2.

It can thus be achieved that the n-wells 301, 403 have a low capacitance, and the n-well responds rapidly with a high voltage amplitude, where an n-well 301, 403 is subject to a light attack. A typical high-speed detection circuit 305, 405 can detect a rapid voltage peak of this type.

In comparison with a dense light sensor cell network (according to the above option C), protection of the chip 300 against light attacks can thus be achieved with a limited consumption of space. Moreover, in this approach, no complex analog circuits are required.

According to one form of embodiment, the detection circuit 305, 405 is based upon the detection of a voltage variation in an n-well 301, 403. An example of a corresponding detection circuit is described hereinafter with reference to FIG. 5.

Figure 5:
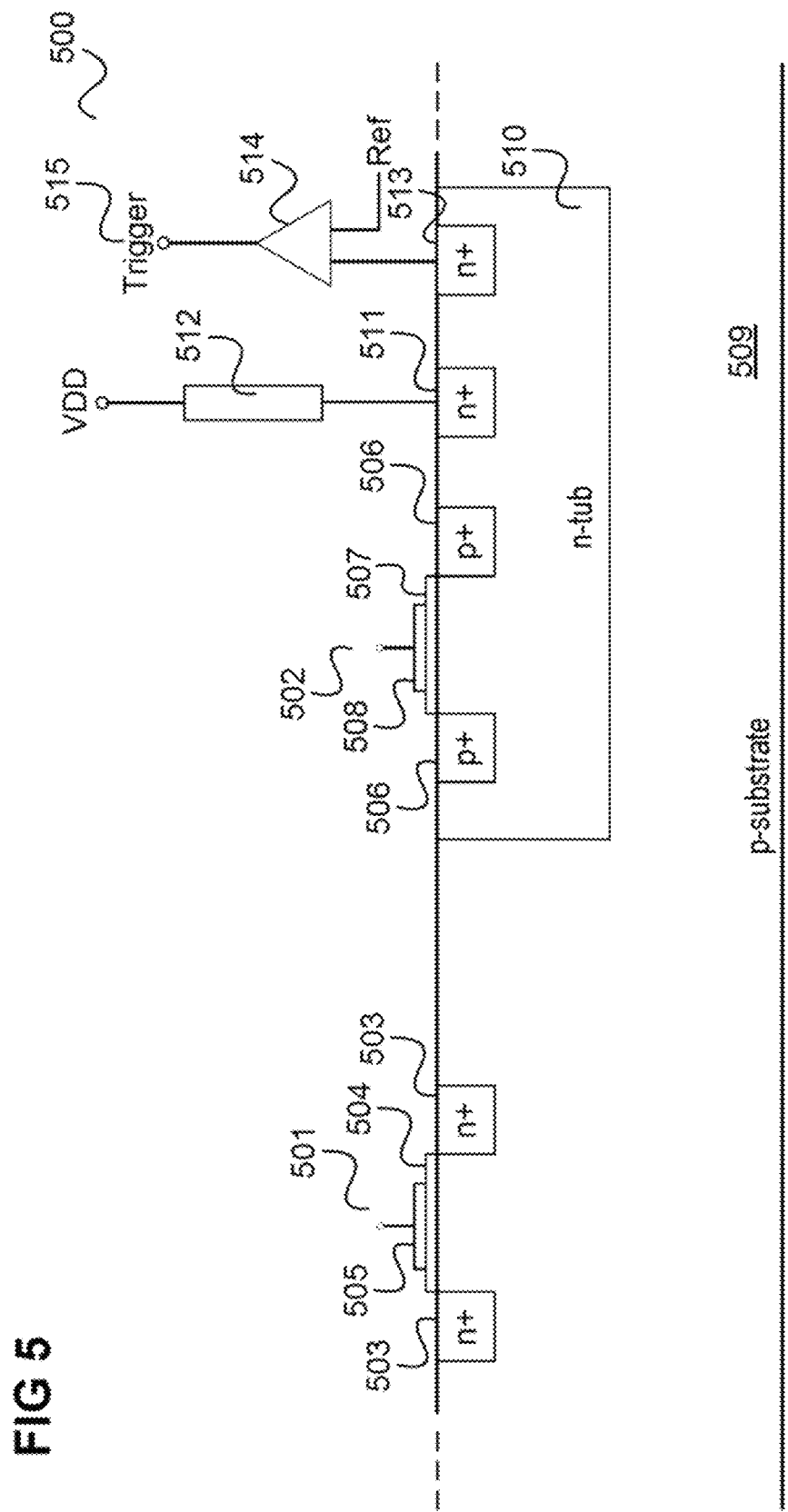
FIG. 5 shows a chip according to one form of embodiment.

FIG. 5 shows a chip 500 according to one form of embodiment.

As exemplary transistors of the chip 300, an nMOS transistor 501 and a pMOS transistor 502 are represented.

The nMOS transistor 501 comprises two n-doped regions 503, an insulating layer 504 and a gate region 505.

Analogously, the pMOS transistor 502 comprises two p-doped regions 506, an insulating layer 507 and a gate region 508.

The nMOS transistor 501 is arranged in a p-substrate 509. The pMOS transistor 502 is arranged in an n-well 510, which is located in the p-substrate 509. The n-well 510 comprises a first well connection region 511. The first well connection region 511 is connected to the high supply potential (VDD) by means of pull-up circuit 512.

A second well connection region 513 is moreover connected to the first input of a comparator 514. This first input, for example, can be further connected to the high supply potential in a high-resistance arrangement (not represented). The second input of the comparator 514 is connected to a reference potential (lower than VDD). The comparator 514 thus implements a detection circuit for the detection of light attacks, as described hereinafter.

The first well connection region 511 is connected via the pull-up circuit 512, in a high-resistance arrangement, to the high supply potential. An attack thus results in the discharging of the n-well 510, such that the potential of the n-well 510, in relation to VDD, is reduced for a certain time. If the potential to which the n-well 510 falls is lower than the reference potential, this is correspondingly detected by the comparator, and a trigger signal 515 is generated by the comparator.

By the appropriate selection of the reference potential, a light attack which results in the discharging of the n-well 510, can be detected accordingly.

Light attacks on the chip of lower and moderate amplitude can be detected by a reduction of the well potential. The detection circuit 514 detects the light attack by means of the reduced well potential.

In order to prevent, or at least handicap any deliberate manipulation of the pull-up mechanisms, the pull-up circuit 512, according to various forms of embodiment, is constituted in the form of one or more transistors, which are identical or similar to those which are employed for the embodiment of the logic cells in the logic tracks 303 (or at least in the respective logic track 303). In other words, the pull-up is executed by means of one or more transistors, which are typically employed in logic cells. The pull-up circuit 512 is configured such that it constitutes a resistance between the first n-well terminal 511 and the high supply potential, which is sufficient to meet requirements for the appropriate operation of the chip and the detection of attacks.

The pull-up circuit 512 can be constituted, for example, by one or more transistors which have the same (or at least similar) transistor length and the same (or at least similar) transistor width as those employed for the constitution of the logic cells in the logic tracks 303 (or at least in the respective logic track 303).

Figure 6:
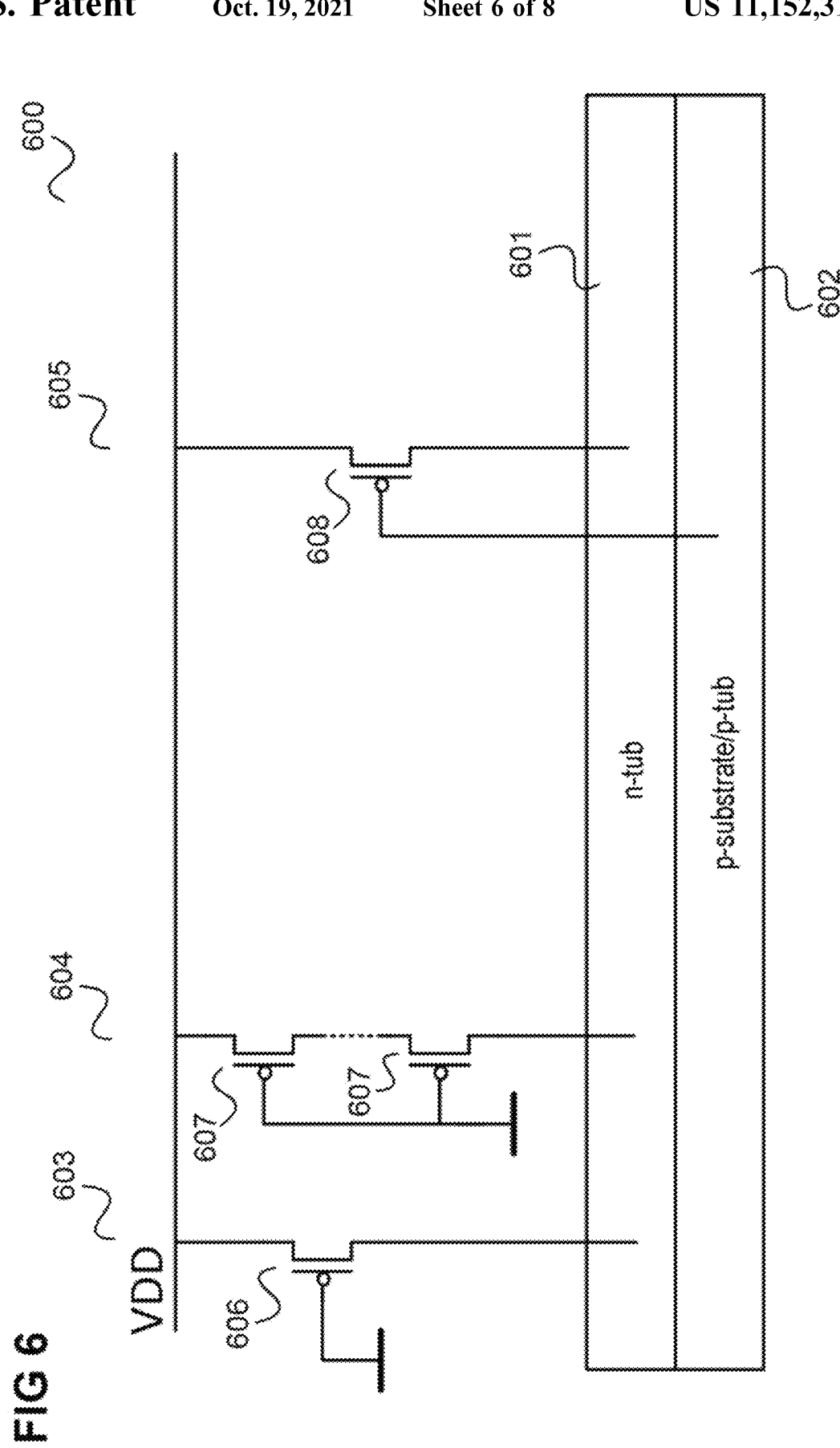
FIG. 6 shows the constitution of pull-up circuits for a logic track, according to various forms of embodiment.

FIG. 6 shows the constitution of pull-up circuits for a logic track 600, according to various forms of embodiment.

The logic track 600, as described above, comprises an n-well strip 601 and a p-substrate strip 602 (or additionally a p-well strip). Although three different embodiments of a pull-up circuit 603, 604, 605 are represented in FIG. 6, only one pull-up circuit 603, 604, 605, for example, is provided for the logic track 600 in practice.

The first pull-up circuit 603 comprises a pMOS transistor 606, the source of which is connected to the high supply potential, the drain of which is connected to the n-well 601 (for example via a $n^+$-doped well terminal, as represented in FIG. 5). The gate of the pMOS transistor 606 is connected to the low supply potential (VSS).

The pMOS transistor 606 constitutes a specific resistance between the high supply potential and the n-well 601, for example according to its dimensioning and the difference between the high supply potential and the low supply potential. This resistance can be increased, wherein a plurality of p-MOS transistors are connected in series, as in the case of the second pull-up circuit 604.

The second pull-up circuit 604 comprises a series circuit of a plurality of pMOS transistors 607, wherein the first pMOS transistor 607 in the series circuit (considered from top to bottom), by means of its source, is connected to the high supply potential, and the last, by means of its drain, is connected to the n-well 601. The gates of the pMOS transistors 607 are connected to the low supply potential (VSS).

A further option for increasing the resistance between the high supply potential and the n-well 601 is represented by the third pull-up circuit 605. The third pull-up circuit 605 comprises a pMOS transistor 608, the source of which is connected to the high supply potential, and the drain of which is connected to the n-well 601 (for example via an n$^+$-doped well terminal, as represented in FIG. 5). The gate of the pMOS transistor 608 is connected to the adjoining p-substrate strip 602 (or p-well strip) (for example via a p$^+$-doped p-substrate terminal or p-well terminal). In this manner, the resistance of the third pull-up circuit 605, in comparison with the first pull-up circuit 603, can be increased in the event of an attack, as a result of which a more sensitive attack detection can be achieved.

A further option for a pull-up circuit based upon one or more transistors, e.g. pMOS transistors, is the constitution of a switched capacitance, wherein an n-well 301, 403, by means of short pulses (for example, corresponding logic pulses) is charged or discharged. This approach permits an appropriate (equivalent) resistance to be constituted between the high supply potential and the n-well, which is averaged over time.

The one or more pMOS transistors, which are provided for the constitution of a pull-up circuit for an n-well, can be arranged in the n-well itself or in another (e.g. adjoining) n-well.

Figure 7:
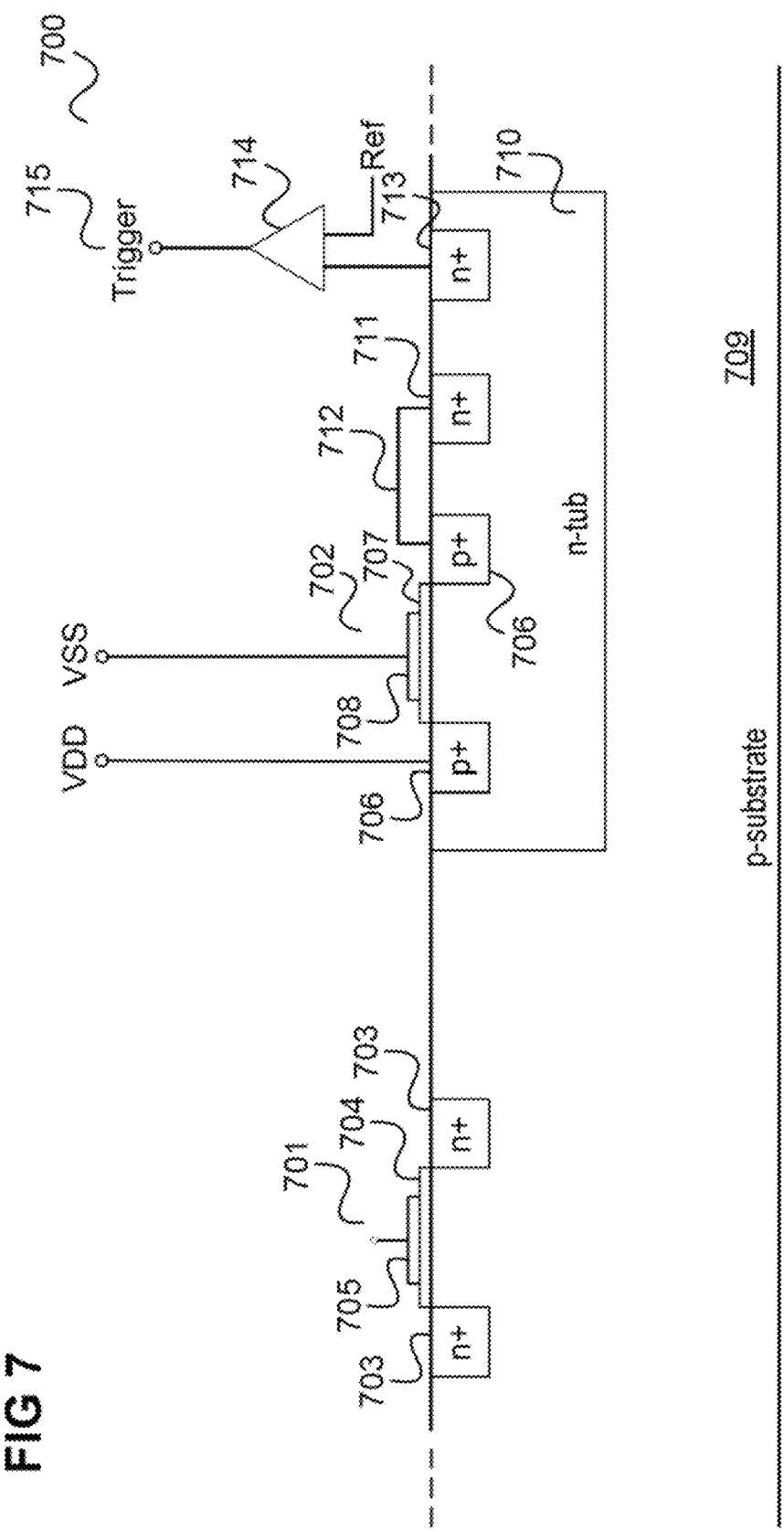
FIG. 7 shows an example of the constitution of a pull-up circuit for an n-well, by means of a pMOS transistor arranged in the n-well itself.

FIG. 7 shows an exemplary constitution of a pull-up circuit for an n-well, by means of a pMOS transistor which is arranged in the n-well itself.

In this example, a pull-up circuit is constituted in a corresponding manner to the first pull-up circuit 606 according to FIG. 6.

The example in FIG. 7 is based upon the representation in FIG. 5. Correspondingly, a chip 700 with an nMOS transistor 701 and a pMOS transistor 702 is represented. The nMOS transistor 701 comprises two n-doped regions 703, an insulating layer 704 and a gate region 705. Analogously, the pMOS transistor 702 comprises two p-doped regions 706, an insulating layer 707 and a gate region 708.

The nMOS transistor 701 is arranged in a p-substrate 709. The pMOS transistor 702 is arranged in an n-well 710, which is located in the p-substrate 709. The n-well 710 can comprise many further pMOS transistors, for example for the implementation of a logic. The pMOS transistor 702 represented is employed for the constitution of a pull-up circuit. To this end, one of the p-doped regions 706 of the pMOS transistor (drain), by means of a connection 712, is connected to a first well connection region 711 of the n-well 710. The other p-doped region 706 of the pMOS transistor 706 (source) is connected to the high supply potential (VDD). The gate region 708 of the pMOS transistor 702 is connected to the low supply potential (VSS). The connection 712 is provided, for example, by a metallization layer of the chip 700.

Analogously to the example according to FIG. 5, a second well connection region 713 is further connected to the first input of a comparator 714. This first input, for example, can moreover be connected to the high supply potential (not represented) in a high-resistance arrangement. The second input of the comparator 714 is connected to a reference potential (lower than VDD). The comparator 714 thus implements a detection circuit for the detection of light attacks.

It should be observed that, although the above-mentioned examples have been described for a p-substrate, n-wells and the constitution of a pull-up circuit by one or more pMOS transistors, the above-mentioned approach can be applied analogously for an n-substrate, p-wells and the constitution of a pull-down circuit by one or more nMOS transistors.

Figure 8:
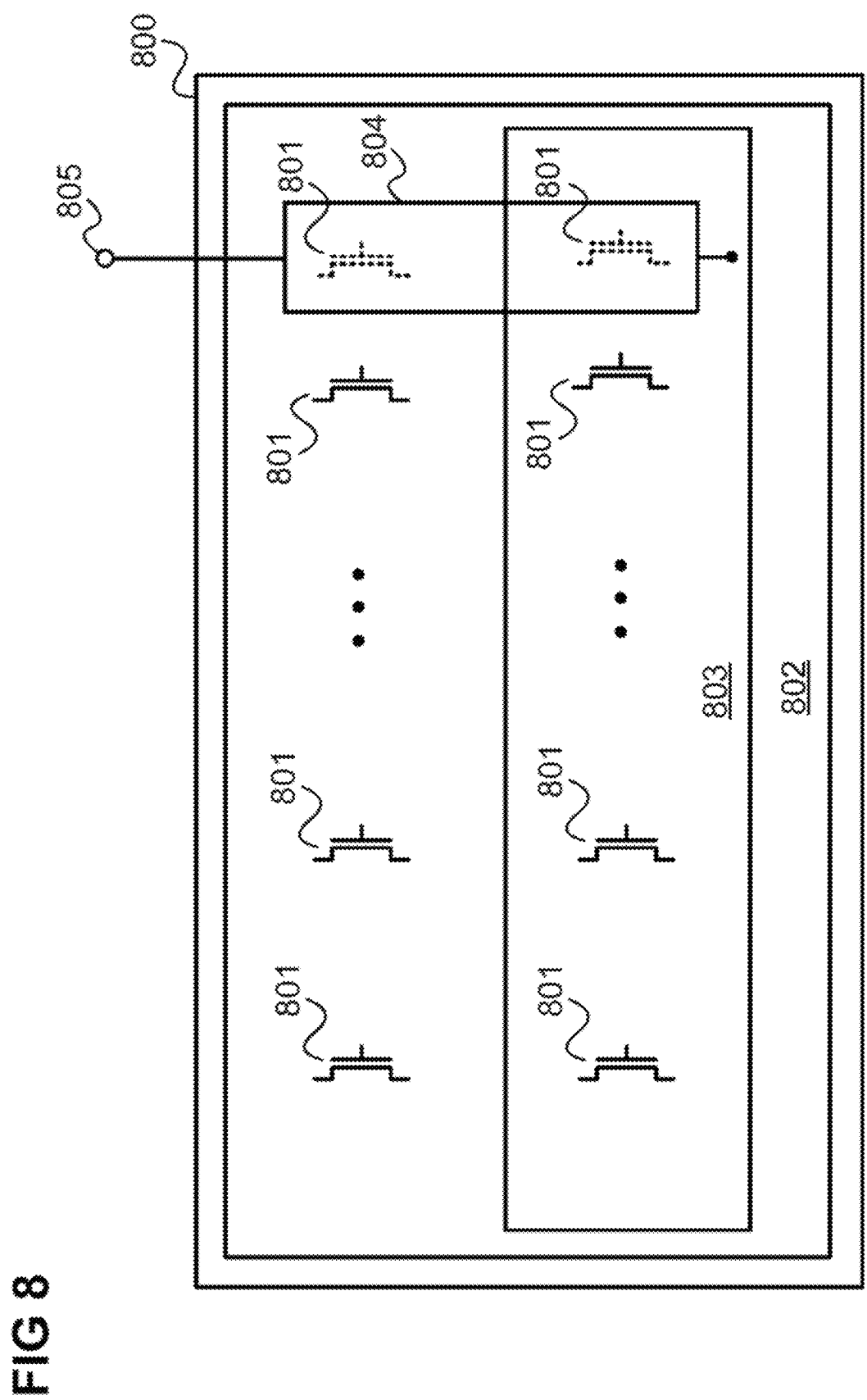
FIG. 8 shows an integrated circuit.

In summary, according to various forms of embodiment, an integrated circuit is provided, as represented in FIG. 8.

FIG. 8 shows an integrated circuit 800.

The integrated circuit 800 comprises a plurality of field-effect transistors 801, wherein at least a proportion of the field-effect transistors implement a plurality of logic cells.

The integrated circuit 800 further comprises a substrate 802 and a well 803 arranged in the substrate.

The integrated circuit 800 further comprises a supply circuit 804, which is designed to connect the well to a supply potential 805, wherein the supply circuit 804 is constituted by one or more field-effect transistors of the plurality of field-effect transistors 801.

In other words, according to various forms of embodiment, a supply circuit (e.g. a pull-up circuit or a pull-down circuit) for a well region (i.e. for a doped well) is provided by means of transistor elements, which are also employed for the provision of a logic circuit. The transistor elements can be arranged in the doped well itself, in another (identically or complementarily doped) well and/or in the substrate. As mentioned above, exemplary embodiments which are described for an n-well and which describe a pull-up circuit can be analogously applied for a p-well and a pull-down circuit. In place of p-channel transistors in the n-well, for example, n-channel transistors are then present in the p-well.

For example, each of a plurality of n-wells (which are provided for the constitution of logic, e.g. of logic cells) contains a transistor-based pull-up circuit (e.g. a pull-up resistor circuit). The pull-up circuit is thus intended to maintain the n-well (at least approximately) at the potential of the high supply potential. The pull-up circuit (or pull-up structure) comprises, for example, one or more pMOS transistors, and is encapsulated in the logic (e.g. surrounded by other transistors which implement the logic cells). The constitution of the pull-up circuit by transistors which are equivalent to the transistors which implement the logic (e.g. having the same or essentially the same dimensioning) is such that the pull-up circuit is very difficult for an attacker to locate, as the type of transistors which constitute the pull-up circuits are present in large numbers in the integrated circuit.

The integrated circuit can be constituted, for example, as a CMOS circuit. The CMOS threshold voltage can thus be employed, for example, to trip a trigger signal. For example, the dependency of a threshold voltage upon a well potential can be employed to trigger an alarm, if the well potential shows a variation of sufficient magnitude in response to a light attack.

The field-effect transistors of the plurality of field-effect transistors, for example, are all equally dimensioned. This can be understood in that the field-effect transistors of the plurality of field-effect transistors (e.g. apart from process fluctuations) assume an identical dimensioning (e.g. an equal transistor length and an equal transistor width). The field-effect transistors of the plurality of field-effect transistors (and thus the field-effect transistors which constitute the logic cells, and those which constitute the supply circuit), according to one exemplary embodiment, can also be equivalent to the extent that, in a manufacturing process, they can be constituted in the same process step (or in the same process steps).

The integrated circuit can comprise a plurality of wells, each of which is maintained at a supply potential by a supply circuit (e.g. by a pull-up circuit, in the case of an n-well), and each of which can be provided with a detection circuit. As a result, a detection of light attacks (e.g. laser attacks) can be achieved which encompasses the entire logic area (e.g. the entire semi-custom area). By an appropriate configuration of the detection circuit, charges induced by a light attack can be detected before any logic states are altered by the attack.

Various exemplary embodiments are indicated hereinafter.

Exemplary embodiment 1 is an integrated circuit, as represented in FIG. 8.

Exemplary embodiment 2 is the integrated circuit according to exemplary embodiment 1, further comprising a detection circuit, which is designed to monitor a potential of the well.

Exemplary embodiment 3 is the integrated circuit according to exemplary embodiment 1 or 2, wherein the detection circuit is designed to check whether the potential of the well deviates from the supply potential by at least a predefined value and, in the event that the potential of the well deviates from the supply potential by at least said predefined value, to generate a trigger signal.

Exemplary embodiment 4 is the integrated circuit according to one of the exemplary embodiments 1 to 3, wherein the well is an n-well, the supply potential is a high supply potential and the supply circuit is a pull-up circuit.

Exemplary embodiment 5 is the integrated circuit according to exemplary embodiment 4, wherein the plurality of field-effect transistors comprises a plurality of p-channel transistors, which are arranged in the n-well.

Exemplary embodiment 6 is the integrated circuit according to one of the exemplary embodiments 4 or 5, wherein the supply circuit is constituted by one or more p-channel transistors.

Exemplary embodiment 7 is the integrated circuit according to one of the exemplary embodiments 4 to 6, wherein the supply circuit is constituted by one or more of the p-channel transistors arranged in the n-well.

Exemplary embodiment 8 is the integrated circuit according to one of the exemplary embodiments 1 to 3, wherein the well is a p-well, the supply potential is a low supply potential and the supply circuit is a pull-down circuit.

Exemplary embodiment 9 is the integrated circuit according to one of the exemplary embodiments 1 to 8, wherein the circuit is configured as a CMOS circuit.

Exemplary embodiment 10 is the integrated circuit according to one of the exemplary embodiments 1 to 9, wherein the field-effect transistors of the plurality of field-effect transistors are equally dimensioned.

Exemplary embodiment 11 is the integrated circuit according to one of the exemplary embodiments 1 to 10, wherein the field-effect transistors of the plurality of field-effect transistors are identically dimensioned.

Exemplary embodiment 12 is the integrated circuit according to one of the exemplary embodiments 1 to 11, wherein the supply circuit is constituted by a field-effect transistor, which is connected between a supply terminal for the supply potential, and the gate of which is connected to another supply potential, which is complementary to the supply potential.

Exemplary embodiment 13 is the integrated circuit according to one of the exemplary embodiments 1 to 11, wherein the supply circuit is constituted by a series circuit of field-effect transistors, which is connected between a supply terminal for the supply potential, wherein the gates of the field-effect transistors are connected to another supply potential, which is complementary to the supply potential.

Exemplary embodiment 14 is the integrated circuit according to one of the exemplary embodiments 1 to 11, wherein the well is a well of a first doping type, and wherein the supply circuit is constituted by a field-effect transistor, which is connected between a supply terminal for the supply potential, and the gate of which is connected to a region of a second doping type, which is complementary to the first doping type.

Exemplary embodiment 15 is the integrated circuit according to one of the exemplary embodiments 1 to 11, wherein the well is a well of a first doping type, and wherein the supply circuit is constituted by a series circuit of field-effect transistors, which is connected between a supply terminal for the supply potential, wherein the gates of the field-effect transistors are connected to a region of a second doping type, which is complementary to the first doping type.

Exemplary embodiment 16 is the integrated circuit according to exemplary embodiment 14 or 15, wherein the first doping type is an n-doping, and the second doping type is a p-doping, or wherein the first doping type is a p-doping and the second doping type is an n-doping.

Exemplary embodiment 17 is the integrated circuit according to one of the exemplary embodiments 14 to 16, wherein the region is another well or the substrate.

Exemplary embodiment 18 is the integrated circuit according to one of the exemplary embodiments 1 to 17, comprising a plurality of wells of the same doping type, which are isolated from one another, and each of which comprises a supply circuit which is designed to connect the well to the supply potential, wherein the supply circuit is constituted by one or more field-effect transistors of the plurality of field-effect transistors.

Exemplary embodiment 19 is the integrated circuit according to one of the exemplary embodiments 1 to 18, wherein the supply circuit is constituted by one or more field-effect transistors of the plurality of field-effect transistors, wherein the one or more field-effect transistors which constitute the supply circuit are arranged in the well, in the substrate or in another well, and are surrounded by a plurality of further field-effect transistors, which implement the logic cells and are arranged in the well, in the substrate or in the other well.

According to a further exemplary embodiment, an integrated circuit is provided, wherein a pull-up circuit for an n-well (or a pull-down circuit for a p-well) is constituted by one or more field-effect transistors. The one or more field-effect transistors are of the same type (for example, of the same dimensioning, e.g. with respect to length and width) as the field-effect transistors of the integrated circuit which are provided for the delivery of logic.

Although the invention has primarily been represented and described with reference to specific forms of embodiment, it should be understood by any person familiar with the field that numerous variations with respect to configuration and details can be undertaken, without departing from the substance and the field of the invention, as defined by the claims hereinafter. The field of the invention is therefore specified by the attached claims, and it is intended that all such variations which fall within the literal sense or the range of equivalence of the claims should be included.

LIST OF REFERENCE NUMBERS

100 Data processing device
101 Integrated circuit
200 Chip
201 Common n-well
202 p-wells
203 n-wells
204 Connection line
205 Pull-up circuit
206 Overall detection circuit
300 Chip
301 n-wells
302 p-substrate
303 Logic tracks
304 Pull-up circuit
305 Detector circuit
400 Logic track
401 p-substrate
402 nMOS transistors
403 n-well
404 pMOS transistors
405 Detection circuit
406 Pull-up circuit
500 Chip
501 nMOS transistor
502 pMOS transistor
503 n-doped regions
504 Insulating layer
505 Gate region
506 p-doped regions
507 Insulating layer
508 Gate region
509 p-substrate
510 n-well
511 Well connection region
512 Pull-up circuit
513 Well connection region
514 Comparator
515 Trigger signal
600 Logic track
601 n-well
602 p-substrate
603-605 Pull-up circuits
606-608 pMOS transistors
700 Chip
701 nMOS transistor
702 pMOS transistor
703 n-doped regions
704 Insulating layer
705 Gate region
706 p-doped regions
707 Insulating layer
708 Gate region
709 p-substrate
710 n-well
711 Well connection region
712 Connection
713 Well connection region
714 Comparator
715 Trigger signal
800 Integrated circuit
801 Field-effect transistors
802 Substrate
803 Well
804 Supply circuit
805 Supply potential

The invention claimed is:

1. An integrated circuit, comprising:
   a plurality of field-effect transistors, wherein a first portion of the plurality of field-effect transistors implement a plurality of logic cells;
   a substrate;
   a well arranged in the substrate; and
   a supply circuit configured to connect the well to a supply potential,
   wherein the supply circuit comprises one or more field-effect transistors of a second portion of the plurality of field-effect transistors that is separate from the first portion of the plurality of field-effect transistors.

2. The integrated circuit as claimed in claim 1, further comprising:
   a detection circuit configured to monitor a potential of the well.

3. The integrated circuit as claimed in claim 2, wherein the detection circuit is configured to generate a trigger signal when the potential of the well deviates from the supply potential by at least a predefined value.

4. The integrated circuit as claimed in claim 1, wherein the well is an n-well, the supply potential is a high supply potential, and the supply circuit is a pull-up circuit.

5. The integrated circuit as claimed in claim 4, wherein the plurality of field-effect transistors comprise a plurality of p-channel transistors, which are arranged in the n-well.

6. The integrated circuit as claimed in claim 4, wherein the supply circuit comprises one or more p-channel transistors.

7. The integrated circuit as claimed in claim 4, wherein the supply circuit comprises one or more of the p-channel transistors which are arranged in the n-well.

8. The integrated circuit as claimed in claim 1, wherein the well is a p-well, the supply potential is a low supply potential, and the supply circuit is a pull-down circuit.

9. The integrated circuit as claimed in claim 1, wherein the circuit is configured as a complementary metal-oxide semiconductor (CMOS) circuit.

10. The integrated circuit as claimed in claim 1, wherein the field-effect transistors of the plurality of field-effect transistors are equally dimensioned.

11. The integrated circuit as claimed in claim 1, wherein the field-effect transistors of the plurality of field-effect transistors are identically dimensioned.

12. The integrated circuit as claimed in claim 1, wherein the supply circuit comprises a field-effect transistor, which is connected to a supply terminal for the supply potential, and
   wherein a gate of the field-effect transistor is connected to another supply terminal for another supply potential, which is complementary to the supply potential.

13. The integrated circuit as claimed in claim 1, wherein the supply circuit comprises a series circuit of field-effect transistors, which is connected to a supply terminal for the supply potential, and
   wherein the gates of the field-effect transistors are connected to another supply terminal for another supply potential, which is complementary to the supply potential.

14. The integrated circuit as claimed in claim 1, wherein the well is a well of a first doping type, and
   wherein the supply circuit comprises a field-effect transistor, which is connected to a supply terminal for the supply potential, and wherein a gate of the field-effect transistor is connected to a region of a second doping type, which is complementary to the first doping type.

15. The integrated circuit as claimed in claim 1, wherein:
the well is of a first doping type,
the supply circuit comprises a series circuit of field-effect transistors, which is connected to a supply terminal for the supply potential, and
the gates of the field-effect transistors are connected to a region of a second doping type, which is complementary to the first doping type.

16. The integrated circuit as claimed in claim 14, wherein the first doping type is an n-doping type and the second doping type is a p-doping type, or wherein the first doping type is a p-doping type and the second doping type is an n-doping type.

17. The integrated circuit as claimed in claim 14, wherein the region of the second doping type is another well or the substrate.

18. The integrated circuit as claimed in claim 1, further comprising:
a plurality of wells of the same doping type, which are isolated from one another,
wherein each one of the plurality of wells is associated with a supply circuit which is configured to connect a respective well from among the plurality of wells to the supply potential.

19. The integrated circuit as claimed in claim 1,
wherein the first portion of the plurality of field-effect transistors associated with the supply circuit are arranged in one of the well, in the substrate, or in another well, and
wherein the first portion of the plurality of field-effect transistors are surrounded by the second portion of the plurality of field-effect transistors, which implement the logic cells and are arranged in at least one of the well, in the substrate, or in the other well.

20. The integrated circuit as claimed in claim 1,
wherein the plurality of logic cells implemented by the first portion of the plurality of field-effect transistors are part of a logic track that further includes the second portion of the plurality of field-effect transistors that form the supply circuit, and
wherein the supply circuit is configured to maintain, via the second portion of the plurality of field-effect transistors, the well at the supply potential.

* * * * *